United States Patent [19]

Makela

[11] 4,203,611
[45] May 20, 1980

[54] RUNNING BOARD FOR LIGHT TRUCKS

[75] Inventor: Martin A. Makela, Waconia, Minn.

[73] Assignee: J-Mark, Inc., Minneapolis, Minn.

[21] Appl. No.: 923,304

[22] Filed: Jul. 10, 1978

[51] Int. Cl.² ............................................. B60R 3/00
[52] U.S. Cl. .................................................. 280/163
[58] Field of Search ................. 280/163, 164 R, 169; 296/75; 105/443, 450

[56] References Cited

U.S. PATENT DOCUMENTS

| | | | |
|---|---|---|---|
| 1,467,656 | 9/1923 | Sturt | 280/163 |
| 1,674,713 | 6/1928 | Brooks | 280/169 |
| 1,901,869 | 3/1933 | Duffy | 280/163 |
| 2,077,822 | 4/1937 | Baker | 280/163 |

Primary Examiner—David M. Mitchell
Attorney, Agent, or Firm—H. Dale Palmatier

[57] ABSTRACT

An attachment running board for light trucks comprising a depending mounting panel and a separate horizontal deck, both of extruded aluminum and attached to each other in an insert and socket connection, open bottom channels beneath the deck and flat-surfaced square-headed bolts attaching the channels to the transverse frame arms secured to the frame of the truck and accommodating attaching at any of a multiplicity of locations along the length of the deck to the frame arms without requiring any drilling of the deck.

18 Claims, 6 Drawing Figures

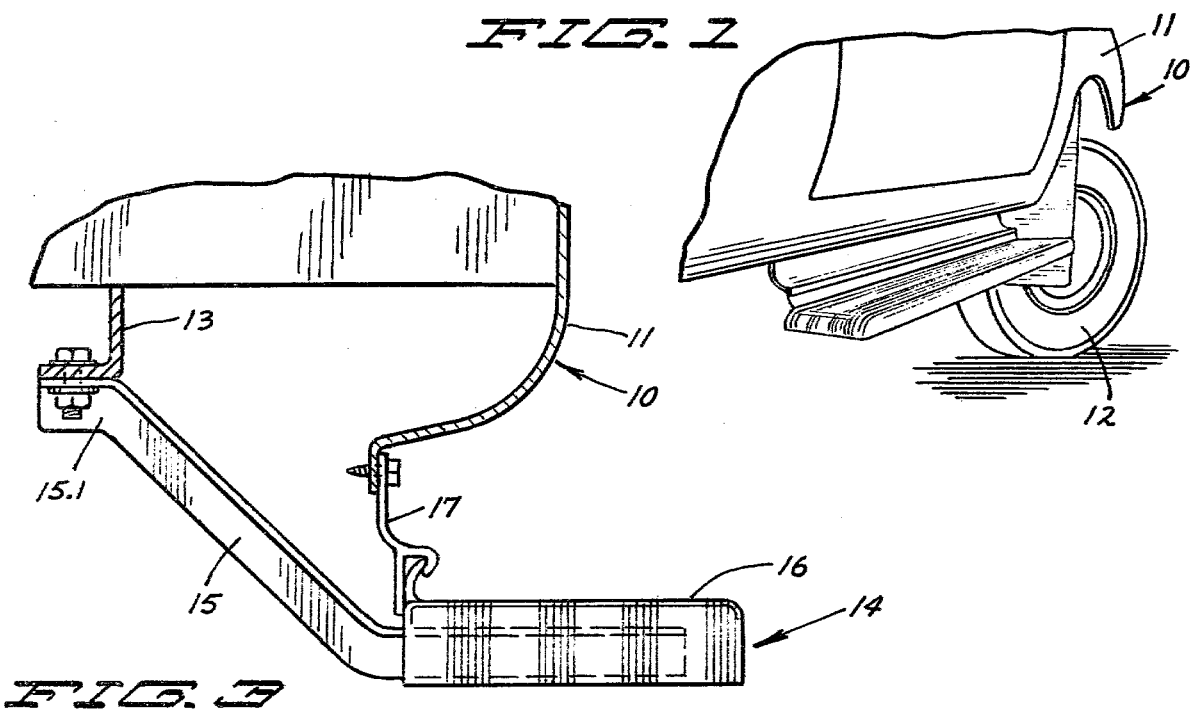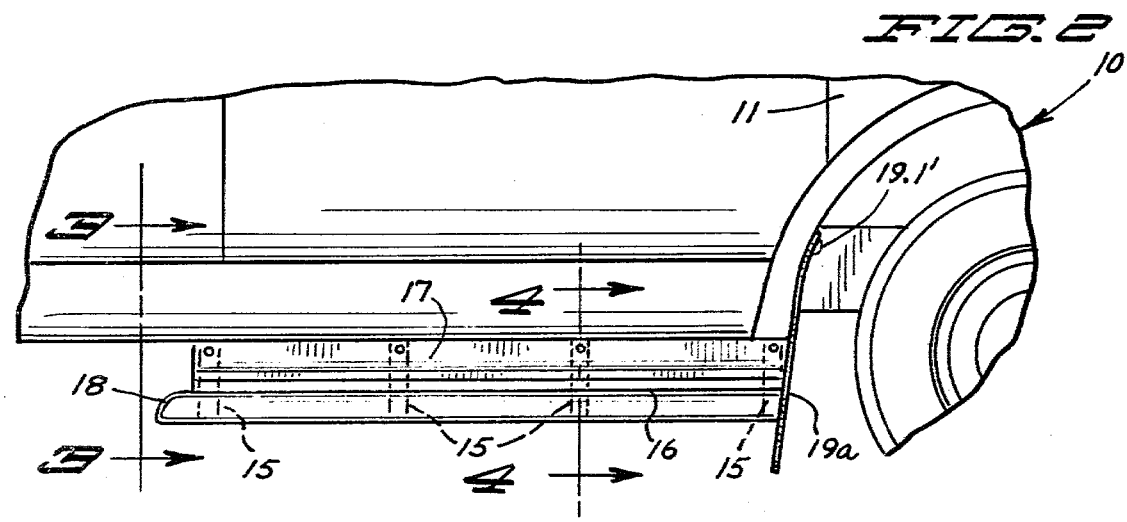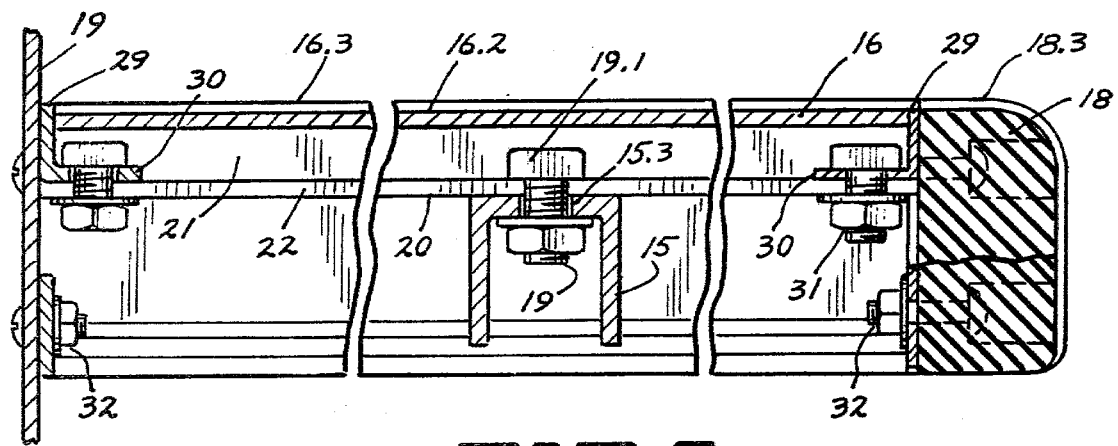

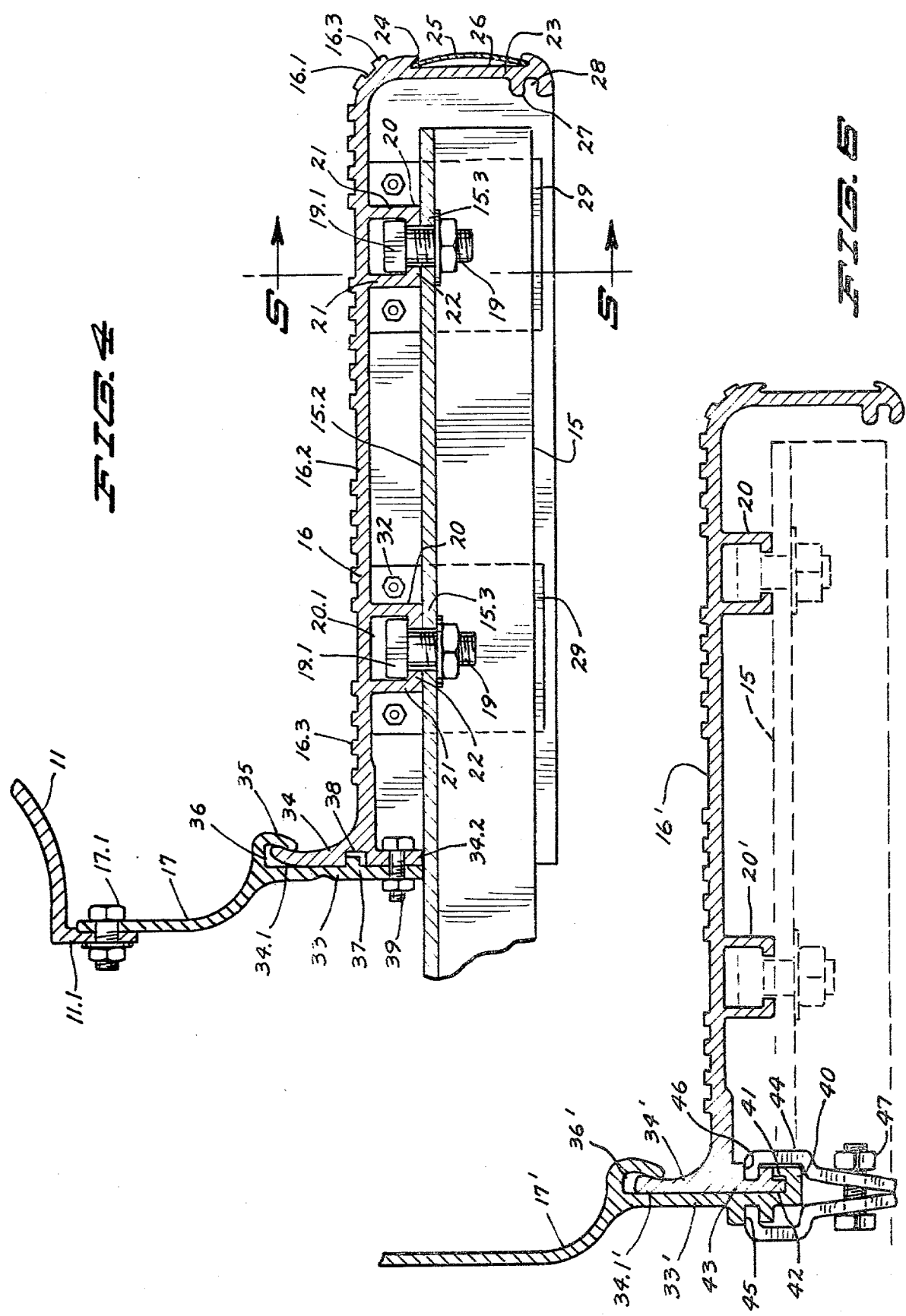

RUNNING BOARD FOR LIGHT TRUCKS

BACKGROUND OF INVENTION

Although most light trucks, usually designated one-half ton or three-quarter ton, are not equipped at the factory with running boards, many owners like to have such running boards which make ingress and egress at the cab considerably easier.

Various crude forms of attachable running boards have been devised; however, the mounting of such running boards to the frame or body of the truck has been especially difficult. Also, attachment of trim and finished ends has continued to be a problem.

Most prior running boards are fabricated by bending steel plates so as to form a horizontal deck, an upstanding flange at the inner side of the deck for attachment to the truck cab, and a depending lip at the outer side of the deck. Bending of the depending lip from the deck has not allowed placing any non-slip treads in the metal of the board at the bend, which is, very frequently, the location which is first engaged by a person's boot as he mounts the board for getting into the cab.

SUMMARY OF THE INVENTION

This invention is an improvement in running boards for light trucks, principally in regard to ease of mounting, extruding the board in two part aluminum construction for ease of mounting and for forming non-slip tread at the corners between the horizontal deck and the depending outer lip, and the mounting of trim and finished ends on the aluminum boards.

More specifically, by extruding the aluminum deck and outer depending lip in one piece and by extruding upright attachment panel in a second piece, the upright panel may be easily suspended from the truck body, and the other heavier deck and lip may be readily snapped onto the upright panel and then easily attached to other transverse frame arms mounted on the truck frame. Regardless of the exact location of the frame arms, the deck is readily bolted to arms without drilling holes.

In this regard, the deck has a pair of depending channels opening downwardly on its bottom side. Square heads of bolts are retained in such channels and are secured to the transverse frame arms which underlie the channels. The bolts and frame arm may have an almost infinite variety of locations of attachment to the deck without drilling holes.

The same extruded channels beneath the deck also facilitate attachment of end caps or trim to the running boards. Such end caps have apertured ears extending endwise of the deck adjacent the channel so that a bolt with its square head in the channel may clamp the apertured ear to the channel and deck. The end cap at the rear end of the board may also be aluminum, or may be of rubber or molded plastic. Similarly, the mudguard at the front fender may be attached to the end of the deck and channel in the same way.

The corner between the outer side of the horizontal deck and the depending lip is smoothly rounded and has non-skid treads shaped into the outer face.

The lip has shallow grooves to mount a trim strip, name strip, or similar personalizing indicia.

The upright panel and the deck have interlocking socket and insert permitting snapping together without longitudinal sliding. After assembly of the socket and insert, the deck is swung down into horizontal position and is locked to the panel. The deck is then held down by bolting to the frame arm, as described above.

BRIEF DESCRIPTION OF DRAWINGS

FIG. 1 is a perspective view of the running board applied to the body of a light truck.

FIG. 2 is a front elevation view of the running board.

FIG. 3 is an enlarged detail section view taken approximately at 3—3 of FIG. 2.

FIG. 4 is an enlarged detail section view taken approximately at 4—4 of FIG. 2.

FIG. 5 is an enlarged detail section view taken approximately at 5—5 of FIG. 4.

FIG. 6 is a section view of a modified form of the invention.

DETAILED SPECIFICATION

The light truck is indicated in general by numeral 10, and its cab body 11, and front wheel 12, and the frame 13, are all shown somewhat diagrammatically. The exact shape of the cab body 11 and the frame 13 may vary slightly from one vehicle to another, but they are all similarly shaped. Likewise, although the light truck illustrated is considered to be a pickup truck with a box-type truck body behind the cab, the truck could be a panel truck to which the present running boards may also be mounted.

The running board is indicated in general by numeral 14, and in general includes a plurality of elongate frame arms 15, a deck 16, and an upright mounting or kick panel 17. Also, certain trim is provided at the ends of the running board, such as end caps 18 and splash guards 19a at the rear and front ends of the board as illustrated.

The deck 16 and mounting plate 17 are separate and distinct pieces and are both formed of extruded aluminum according to the present invention. Although the decks 16 and 17 could be formed of other materials such as steel, the use of aluminum has proved very satisfactory, both in terms of utility and appearance, and the aluminum material facilitates ready and easy shaping of the portions of the deck and panel, because the deck and panel are extruded of aluminum.

The elongate frame arms 15 have inner end portions 15.1 which are solidly bolted to the frame 13 of the vehicle. The outer end portion 15.2 of each of the frame arms extends transversely of and underlies the deck 16 to supply support therefor. The outer end portions of the frame arms have a number of slot-shaped openings or holes 15.3 therein for the square head mounting bolts 19.

The deck 16 is provided with a pair of mounting channels 20 to facilitate attachment to the frame arms 15. Each of the channels 20 extends along the full length of the deck 16 and is unobstructed all along its length. The channels are formed integrally of the deck, and include a pair of depending walls 21, each of which has an in-turned lower lip 22 which restricts, slightly, the open bottom of the channel and provides a supporting ledge upon which the flat-sided square head 19.1 of each of the clamping bolts 19 is carried. The flat-sided square head 19.1 of each of the bolts acts as a slide in the open interior 20.1 of the channel so that the bolt can be located at almost an infinite number of locations along the length of the deck. Therefore, any suitable location of frame arms 15 can be accommodated, depending upon the exact manner of mounting of the frame arms to the truck frame that can be arranged. It will be recognized that the flat-sided square heads 19.1 of the bolts span the entire width of the open interior 20.1 of the channel so that the channel sidewalls 21 will prevent the bolts from turning as the nuts are applied to clamp the frame arms 15 to the deck. Although the channels 20 with the slidable bolt heads therein do provide substantial advantage, other forms of slides may be substituted for the bolt heads and other forms of trackways might be substituted for the channels 20 in providing an infinite number of possible locations or adjustments of the frame arms with respect to the deck. For instance, the trackway might have a suspended or inverted "T" shape and a clevis to grip the "T" may be devised and bolted to the frame arm at the desired location along the length of the deck. In other instances, it may be desirable to devise a slide which may frictionally grip or clamp the lower portion of the wall-shaped depending rib 23 which depends from the outer side portion of the deck 16 and such a slide may be also attached as by bolts to the frame arms 15. It is significant to note that any of a number of such trackway arrangements on the deck and slides carried or suspended thereon may be used to clamp the deck in fixed relation to the frame arms 15. The channels 20 have the particular advantage of retaining the flat-headed bolts against turning so that the nuts may be tightened onto the frame arms easily and firmly.

The depending wall-shaped rib 23 at the outer side of the deck has a shallow groove 24 formed in the outer face thereof to receive the edges of a semi-rigid strip 25 which may be inserted to provide color trim to coordinate with the color of the paint of the truck body 11. It will also be recognized that other form of trim may be incorporated into the trim strip 25, or alternatively, identifying indicia may be carried on the strip 25 such as initials or numbers relating to the vehicle or the driver thereof. If desired, the strip 25 may be entirely eliminated and the exposed outer surface 26 of the rib 23 may simply be painted or trimmed as desired. The bead-shaped lower end 27 of the rib 23 may be provided with a narrow-necked groove 28 to accommodate mounting various forms of trim that may be suspended from the running board, or to otherwise accept screws at the end of the board for mounting end trim.

The deck 16 has a rounded upper surface 16.1 at the outer side of the deck and adjacent the depending wall-shaped rib 23. The entire upper surface 16.2 of the deck, together with the rounded corner portion 16.1 of the upper surface is provided with non-skid treads 16.3 so as to make it less likely that a person mounting the cab via the running board will slip. The treads 16.3 are in the form of ribs protruding slightly upwardly from the surface of the deck and the ribs 16.3 extend the full length of the deck as illustrated in FIG. 5.

Mounting plates 29 are utilized at opposite ends of the deck 16 for attaching the end caps 18 and splash guards 19a. Each of the mounting plates 29 has an apertured ear 30 which extends into the interior 20.1 of one of the channels 20 and overlies the supporting lips 22. Another square-headed bolt 31 is used to clamp the apertured ear 30 to the lips 22 of the channel. The end caps 18 and splash guards may be attached to the mounting plates as by bolts 32. The end caps 18 may be formed of molded rubber or injection molded plastic or may also be formed of aluminum. On the top and end faces of the end caps 18, ribs 18.3 constitute extensions or continuations of the ribs 16.3 on the top surface of the deck so as to coordinate the appearance of the end caps with the deck. Of course, it may be desirable that the splash guards be attached to the fender welds of the vehicle as by screws 19.1'.

The mounting or kick panels 17 are drilled at numerous locations along their length and are attached as by bolts 17.1 to the depending body lips 11.1 of the cab body of the truck for the purpose of suspending the inner side of the deck 16. In most instances, the panel 17 will be detached from the deck 16 and will be mounted to the truck body prior to connecting the deck 16 to the panel 17. The panel 17 extends entirely along the length of the deck 16 and has a depending attachment wall 33 which normally confronts the upstanding mounting flange or wall 34 of the deck. The mounting panel 17 is provided with a depending lip or flange 35 which cooperates with the wall 33 in defining a downwardly opening mounting groove 36 which is somewhat narrower at its open bottom than in its inner upper portion. The groove 36 and lip 35 extend along the full length of the panel 17, and the upper edge 34.1 normally extends into the mounting groove 36 and extends along the full length of panel 17. The edge portion 34.1 of flange 34 and the depending flange 35 of the panel 17 bear very firmly with substantial pressure against each other and provide a friction fit so as to restrain any possible movement of the deck with respect to the panel 17.

The mounting wall 33 has an elongate indexing rib or flange 37 extending all along its length and projecting outwardly from the outer face thereof, and normally the rib 37 is received in an elongate indexing groove 38 in flange 34 and extending along the full length thereof. The rib 37 and groove 38, when assembled, prevent any vertical shifting of the inner side of the deck 16 with respect to the panel 17. Although the insert 34.1 and groove or socket 36, taken together with the rib 37 and groove 38, will be sufficient to create a solid relationship between the panel 17 and deck 16, especially after deck 16 is clamped to the frame arms 15, it may be desirable to also clamp the wall 33 to a depending flange 34.2 of the deck 16 together by an additional clamping bolt 39. Although one such clamping bolt 39 may be adequate, oftentimes several such clamping bolts are utilized, spaced from each other along the length of the deck.

When the attachment type running board 14 is to be applied to the truck, the frame arms 15 are first attached to the frame and then the upper edge of the panel 17 is bolted to the depending lip 11.1 of the vehicle cab. The extruded aluminum panel 17 is light and easy to handle and can be easily bolted into position. The deck 16 is then moved transversely into assembled relation with the groove 36 and ribs 37 of the panel and the insert edge 34.1 is initially inserted into the groove as the deck is held in inclined position, with the inner edge of the deck lowermost and the outer edge portion thereof elevated. When the insert edge portion 34.1 has been inserted deeply into the groove 36, the deck will be swung downwardly so as to assemble the rib 37 into groove 38. Thereafter bolts 39 may be inserted.

The bolts 19 will be adjusted along the length of the channels 20 so that they may be assembled with the frame arms 15 to hold the deck 16 downwardly onto the frame arms which provide substantial support therefor. As the nuts on the bolts 19 are tightened, the flat-sided square heads 19.1 resist turning by the walls 21 of the channels so that tightening of the nuts may proceed without problem.

After the deck 16 has been located and assembled with the panel 17 as described, the end caps 18 may be applied in the manner indicated, and the mud flaps 19a will be attached to the front of the boards as indicated. It may be that, in some instances, end caps 18 will be used at both ends of the boards, or other forms of end trim may be utilized. It will be recognized that the rounded outer corner at the upper surface of the deck 16 has the non-skid treads formed all the way around the contour of the corner so that when the driver mounts the board for getting into his cab, slipping will be minimized by this construction.

In the form of the invention illustrated in FIG. 6, the deck 16' is substantially similar to that previously illustrated and incorporates the channels 20' to be attached to the frame arms 15. In this form, the mounting or kick panel 17' has its depending mounting wall 33' formed with a ledge 40 defining a groove 41 to receive the bottom edge 42 of a depending flange 43 on the inner side of deck 16'. The groove-shaped socket 36' is somewhat deeper than in the form of the invention illustrated in FIG. 4, and the upper edge 34.1' of the flange 34' will be normally seated and will occupy only approximately one-half the depth of the groove 36. In assembly of the deck 16' onto the panel 17', the insert edge 34.1' will initially be inserted into the groove 36' and then the bottom edge 42 will be slipped downwardly into the groove 41 of panel 17'. A mechanical clamp 44 has its jaws inserted into grooves 45 and 46 of the panel 17' and deck 16' for retaining the deck against upper movement after it is assembled with the panel 17'. The clamp is provided with a tightening bolt 47 to maintain the clamped relationship.

It will be seen that I have provided a new and improved attachment type running board for light trucks wherein the boards are provided with depending mounting panels and outwardly extending decks, which are separate from each other and both formed of extruded aluminum. The panels are suspended from the edge of the cab body and the decks are supported from the panels and from transverse frame arms attached to the truck frame. An almost infinite number of mounting locations is accommodated without requiring drilling of holes by use of the open bottom channels 20 allowing the flat-headed bolts to act as slides in the channels so that they may be adjusted at any location and utilized to clamp the frame arms to the deck. Rib or flange-shaped inserts and groove-shaped sockets ae provided as a connection between the deck and mounting panels for securely holding the decks in the desired location. The same channels which are utilized for attaching the decks to the transverse frame arms are also utilized in mounting the end caps or other trim at the ends of the deck. The rounded outer corner of the upper surface of the deck is provided with non-skid treads, as well as the other portions of the upper surface of the deck to minimize the likelihood that a person will slip as he mounts the board for getting into or out of the truck.

What is claimed is:

1. A running board for attachment to the frame of light trucks, comprising
    an elongate deck to extend along the cab of the truck,
    means mounting the deck to the truck frame and including a plurality of elongate frame arms underlying the deck and extending transversely thereof,
    the deck having a bottom side overlying the frame arms and also having a pair of elongate and parallel rigid mounting channels on said bottom side and extending longitudinally along and substantially throughout the length of the deck, the channel having an unobstructed open bottom and also having depending sidewalls confronting each other and being provided with inwardly turned supporting lips extending toward each other, and
    a plurality of bolts with enlarged flat-sided heads fitting snugly and freely slidable in the channel and carried on said supporting lips, the bolts having depending threaded shanks secured to the transverse frame arms.

2. The running board according to claim 1 and a mounting plate traversing an end of the deck and having a flange protruding longitudinally of the deck and along the bottom of one of the channels, means clamping the flange to the channel, and a fixture secured to the mounting plate adjacent the end of the deck.

3. A running board for attachment to the frame of light trucks, comprising
    an elongate deck to extend along the cab of the truck,
    means mounting the deck to the truck frame and including a plurality of elongate frame arms underlying the deck and extending transversely thereof,
    the deck having a bottom side overlying the frame arms and also having an elongate rigid mounting channel on said bottom side and extending longitudinally along the deck, the channel having an open bottom and also having depending sidewalls confronting each other and being provided with inwardly turned supporting lips extending toward each other,
    a plurality of bolts with enlarged heads in the channel and carried on said supporting lips, the bolts having depending threaded shanks secured to the transverse frame arms, and
    a mounting plate traversing an end of the channel and having an apertured ear in juxtaposition along the supporting lips and clamped thereto, and a fixture secured to the mounting plate adjacent the end of the deck.

4. The running board according to claim 1 and the deck and channel including the sidewalls thereof being formed integrally of each other and in one piece.

5. The running board according to claim 4, and the deck and channel being formed of extruded aluminum.

6. The running board according to claim 1 and the deck being of extruded aluminum, there being a depending wall-shaped rib formed integrally of the deck at the outer side thereof, the deck having an upper surface which is smoothly rounded adjacent the outer side thereof and at the upper portion of said wall-shaped rib, and non-slip treads formed on the upper surface of the deck and formed on the smoothly rounded portion of the upper surface adjacent the outer edge thereof.

7. A running board for attachment to the frame and body of a light truck, comprising
    an elongate deck to lie horizontally and extend along the cab of the truck, the deck having an inner side to confront the truck body and also having an outer side,
    a riged elongate kick panel extending horizontally along the inner side of the deck, the panel being generally vertically oriented and having an upper edge to be attached to the truck body and also having a lower edge, and
    connecting means securing the deck and panel together and including cooperating and interfitting insert and socket means on the inner side of the deck and on the lower edge of the panel for suspending the inner side of the deck, said insert and socket means having transversely facing edge and opening components for assembly upon relative transverse movement of the panel and deck.

8. The running board according to claim 7 and also including a plurality of elongate frame arms for attachment to the truck frame and underlying the deck of the running board and extending transversely thereof, and attachment means slidable along the deck and engaging the frame arms and pulling the deck and frame arms vertically toward and into engagement with each other.

9. The running board according to claim 7 and said connecting means including rigid upright walls on the kick panel and deck and having lower portions lying flush against each other, the walls also having upper portions adjacent each other, said transversely facing edge and opening components including an upstanding flange and a downwardly opening groove on the upper portions of the respective walls, the upstanding flange extending upwardly into the groove and resisting downward tipping of the outer side of the deck, the flange and groove extending substantially throughout the lengths of the elongate deck and panel, the flange and groove being assembleable and dissembleable in response to upward and downward movement of the deck.

10. The running board according to claim 7 and said connecting means including connector portions on the kick panel and deck and bearing horizontally against each other, said transversely facing edge and opening components defining a horizontally projecting elongate rib and a horizontally opening groove respectively on the connector portions, the rib projecting horizontally into the groove and providing vertical support for the inner side of the deck from the panel, the elongate rib extending substantially throughout the entire length of the elongate deck and panel, the rib being transversely insertable into and removable from the groove in response to horizontal movement transversely of the deck.

11. The running board according to claim 9 and wherein the upstanding flange is on the deck and the downwardly opening groove is on the kick panel.

12. The running board according to claim 7 wherein said transversely facing edge and opening components have generally upright faces confronting and engaging each other with significant force and in immovable friction clamping relation to each other when the deck is oriented in horizontal position.

13. The running board according to claim 7 wherein the kick panel defines a downwardly opening groove-shaped socket extending along the length thereof, and the deck having an insert flange along the length thereof and extending upwardly into the groove-shaped socket of the kick panel.

14. A running board for attachment to the frame of a light truck, comprising
an elongate deck to extend along the cab of the truck, the deck having an inner side to confront the truck body and also having an outer side,
a rigid elongate kick panel extending horizontally along the inner side of the deck, the panel being generally vertically oriented and having an upper edge to be attached to the truck body and also having a lower edge,
means mounting the deck to the truck frame and including a plurality of elongate frame arms underlying the deck and extending transversely thereof,
the deck and kick panel having a tiltably mountable and demountable connector means therebetween, said connector means including elongate interfitting parts extending throughout substantially the entire length of the deck and panel, the interfitting parts defining a pair of vertically spaced upper and lower grooves, the upper groove opening downwardly and the lower groove opening horizontally sideward, and the interfitting parts also defining a pair of vertically spaced upper and lower flanges, the upper flange protruding upward into the upper groove and the lower flange protruding horizontally sideward into the lower groove.

15. A running board for attachment to the frame of light trucks, comprising
an elongate deck to extend along the cab of the truck,
means mounting the deck to the truck frame and including a plurality of elongate frame arms underlying the deck and extending transversely thereof,
the deck having a bottom side overlying the frame arm and also having means defining a slide track adjacent the bottom side of the deck, and the deck having an end to which the slide truck extends,
slidable means on said slide track and having fastener means secured to the transverse frame arms, and
a mounting plate traversing the end of the deck and additional slidable means with fastening means thereon securing the mounting plate in stationary relation to the slide track.

16. A running board for attachment to the frame and body of a light truck, comprising
an elongate deck to lie horizontally and extend along the cab of the truck, the deck having an inner side to confront the truck body and also having an outer side,
an elongate kick panel extending horizontally along the inner side of the deck, the panel being generally vertically oriented and having an upper edge to be attached to the truck body and also having a lower edge, and
connecting means securing the deck and panel together and including cooperating and interfitting insert and socket means on the inner side of the deck and on the lower edge of the panel for suspending the inner side of the deck, said insert and socket means having transversely facing edge and opening components for assembly upon relative transverse movement of the panel and deck, the kick panel defining a downwardly open groove-shaped socket extending along the length thereof, and the deck having an insert flange along the length thereof and extending upwardly into the groove-shaped socket of the kick panel, the kick panel having a depending wall confronting said upstanding flange of the deck, the wall and flange having cooperating and interfitting horizontally extending groove and rib retaining the wall and flange in predetermined relation with each other and maintaining the flange in the groove-shaped socket.

17. A running board for attachment to the frame and body of a light truck, comprising
an elongate deck to lie horizontally and extend along the cab of the truck, the deck having an inner side to confront the truck body and also having an outer side with a wall-shaped rib depending therefrom, the deck having a smoothly rounded upper surface at the outer side thereof and at the upper portion of said wall-shaped rib, the deck having non-slip treads formed in the upper surface thereof and formed around the smoothly rounded surface at the outer side, said treads extending longitudinally of the deck to the ends thereof, the wall-shaped rib having an outwardly facing outer surface with a shallow groove carrying a trim strip therein, means mounting the deck to the truck frame and including a plurality of elongate frame arms underlying the deck and extending transversely thereof for attachment to the truck frame, an elongate kick panel extending horizontally along the inner side of the deck, the panel being generally vertically oriented and having an upper longitudinal edge attached to the truck body and also having a lower portion defining an upright attachment wall with an outer face confronting the inner side of the deck, the wall having an upper portion with a depending flange attached thereto and cooperating with the wall in defining an elongate groove-shaped socket extending along the panel, the attachment wall also having an elongate indexing rib extending therealong and projecting outwardly of the outer face thereof, the deck having a bottom side overlying the frame arms and also having an upright mounting flange at its inner side confronting the attachment wall of the kick panel and projecting into the downwardly opening groove-shaped socket of the kick panel, the mounting flange also having an indexing groove extending longitudinally thereof and opening toward the attachment wall of the kick panel and receiving the indexing rib thereof to prevent relative vertical movement between the inner side of the deck and the kick panel, the deck also having a pair of elongate rigid mounting channels on the bottom side thereof and extending longitudinally along the deck and in spaced relation with each other, each of the channels having an open bottom and also having depending sidewalls confronting each other and being provided with inwardly turned supporting lips extending toward each other and spaced from each other to constrict the open bottom of the channel, a plurality of bolts with enlarged, flat-sided heads in the channel and carried on said supporting lips, the bolts having depending threaded shanks secured to the transverse frame arms, a pair of mounting plates traversing adjacent the ends of the channels, each of the mounting plates having an apertured ear in juxtaposition along the supporting lips of the channel and a bolt with an enlarged flat-sided head in the channel and clamping the apertured ear of the mounting plate to the channel, and a fixture secured to the mounting plates at the end of the deck.

18. A running board for attachment to the frame and body of a light truck, comprising an elongate deck to lie horizontally and extend along the cab of the truck, the deck having an inner side to confront the truck body and also having an outer side with a wall-shaped rib depending therefrom, the deck having non-slip treads formed in the upper surface thereof, means mounting the deck to the truck frame and including a plurality of elongate frame arms underlying the deck and extending transversely thereof for attachment to the truck frame, an elongate kick panel extending horizontally along the inner side of the deck, the panel being generally vertically oriented and having an upper longitudinal edge attached to the truck body and also having a lower portion defining an upright attachment wall with an outer face confronting the inner side of the deck, the wall having an upper portion with a depending flange attached thereto and cooperating with the wall in defining an elongate groove-shaped socket extending along the panel, the attachment wall also having an elongate indexing rib extending therealong and projecting horizontally outward of the outer face thereof and toward the deck;

the deck having a bottom side overlying the frame arms and also having a upright mounting flange at its inner side confronting the attachment wall of the kick panel and projecting into the downwardly opening groove-shaped socket of the kick panel, the mounting flange also having an indexing groove extending longitudinally thereof and opening toward the attachment wall of the kick panel and receiving the indexing rib thereof to prevent relative vertical movement between the inner side of the deck and the kick panel, the deck also having a pair of elongate rigid mounting channels on the bottom side thereof and extending longitudinally along the deck and in spaced relation with each other, each of the channels having an open bottom and also having depending sidewalls confronting each other and being provided with inwardly turned supporting the lips extending toward each other and spaced from each other to constrict the open bottom of the channel, and a plurality of bolts with enlarged, flat-sided heads slidably and snugly mounted in the channel and carried on the supporting lips, the bolts having depending threaded shanks secured to the transverse frame arms.

* * * * *

UNITED STATES PATENT AND TRADEMARK OFFICE
CERTIFICATE OF CORRECTION

PATENT NO. : 4,203,611
DATED : May 20, 1980
INVENTOR(S) : Martin A. Makela

It is certified that error appears in the above-identified patent and that said Letters Patent are hereby corrected as shown below:

In claim 15, line 26, delete "truck" and substitute --track--.

In claim 18, line 48, after "supporting", delete --the--.

Signed and Sealed this

Fifth Day of August 1980

[SEAL]

Attest:

SIDNEY A. DIAMOND

Attesting Officer   Commissioner of Patents and Trademarks